US009020544B2

(12) United States Patent
Rybak (10) Patent No.: US 9,020,544 B2
(45) Date of Patent: *Apr. 28, 2015

(54) METHOD AND APPARATUS FOR DERIVING PRESENCE INFORMATION USING MESSAGE TRAFFIC ANALYSIS

(71) Applicant: Research In Motion Limited, Waterloo (CA)

(72) Inventor: Michal Andrzej Rybak, Bridgetown (BB)

(73) Assignee: BlackBerry Limited, Waterloo (CA)

( * ) Notice: Subject to any disclaimer, the term of this patent is extended or adjusted under 35 U.S.C. 154(b) by 103 days.

This patent is subject to a terminal disclaimer.

(21) Appl. No.: 13/633,263

(22) Filed: Oct. 2, 2012

(65) Prior Publication Data
US 2013/0024536 A1    Jan. 24, 2013

Related U.S. Application Data (63) Continuation of application No. 11/567,260, filed on Dec. 6, 2006, now Pat. No. 8,285,312.

(51) Int. Cl.
*H04W 4/00* (2009.01)
*H04B 1/10* (2006.01)
(Continued)

(52) U.S. Cl.
CPC ........................... *G06Q 10/10* (2013.01)

(58) Field of Classification Search
CPC ........ H04W 4/14; H04W 4/12; H04L 12/581; H04L 51/04; H04L 67/24
USPC .............. 455/466, 223, 227, 404.2, 412; 709/206, 207, 223, 337
See application file for complete search history.

(56) References Cited

U.S. PATENT DOCUMENTS 3,899,772 A * 8/1975 Mead et al. ................. 340/10.51
6,301,609 B1 * 10/2001 Aravamudan et al. ........ 709/207
(Continued)

FOREIGN PATENT DOCUMENTS

WO  0243351 A2  5/2002
WO  WO 0243351 A2 * 5/2002
(Continued)

OTHER PUBLICATIONS

European Search Report, EP 06125486, dated May 31, 2007.
(Continued)

*Primary Examiner* — Dung Hong
(74) *Attorney, Agent, or Firm* — Jones Day (57) ABSTRACT

A method and apparatus for deriving presence information of a mobile device at a presence node in a wireless system, the method having the steps of: analyzing a message received from the mobile device to determine a message type; and allocating a state for the mobile device depending on the message type found in the analyzing step. The apparatus is a presence node for deriving and maintaining presence information of a mobile device in a wireless system, the mobile device communicating with a network node, the presence node having: a communication system for communicating with the network node; a processor; and an application running on the processor, the application having means for analyzing a message received from the mobile device at the network node to determine a message type; and allocating a state for the mobile device depending on the message type found in the analyzing step.

11 Claims, 4 Drawing Sheets

(51) Int. Cl.
*H04B 1/16* (2006.01)
*H04M 11/04* (2006.01)
*H04M 1/725* (2006.01)
*G06F 15/16* (2006.01)
*G06F 15/173* (2006.01)
*G06Q 10/10* (2012.01)

(56) References Cited

U.S. PATENT DOCUMENTS

| | | |
|---|---|---|
| 7,110,773 B1 | 9/2006 | Wallace et al. |
| 7,269,162 B1 * | 9/2007 | Turner .......................... 370/352 |
| 7,634,558 B1 * | 12/2009 | Mangal et al. ................ 709/224 |
| 8,285,312 B2 * | 10/2012 | Rybak ........................... 455/466 |
| 2002/0083127 A1 * | 6/2002 | Agrawal ....................... 709/203 |
| 2002/0143916 A1 | 10/2002 | Mendiola et al. |
| 2002/0188714 A1 | 12/2002 | Bouthors |
| 2003/0065788 A1 | 4/2003 | Salomaki |
| 2004/0116137 A1 | 6/2004 | Bells et al. |
| 2004/0203942 A1 | 10/2004 | Dehlin |
| 2005/0058094 A1 | 3/2005 | Lazaridis et al. |
| 2005/0124363 A1 | 6/2005 | Klassen et al. |
| 2006/0239200 A1 * | 10/2006 | Pirzada et al. ................ 370/252 |

FOREIGN PATENT DOCUMENTS

| | | |
|---|---|---|
| WO | 03032616 A1 | 4/2003 |
| WO | 2005027429 | 3/2005 |

OTHER PUBLICATIONS

European Examination Report, EP 06125486, dated Jun. 3, 2008.
European Extended Search Report, EP 06125486, dated Aug. 21, 2007.

* cited by examiner

FIG. 4 though an 802.11 wireless access protocol, in one
METHOD AND APPARATUS FOR DERIVING PRESENCE INFORMATION USING MESSAGE TRAFFIC ANALYSIS

CROSS REFERENCE TO RELATED APPLICATION

This is a continuation of U.S. application Ser. No. 11/567,260, filed Dec. 6, 2006, hereby incorporated by reference.

TECHNICAL FIELD

The present application relates to instant messaging protocols and in particular to the derivation of presence information for a mobile device in a wireless network.

BACKGROUND

Knowledge of presence information for a mobile device in a network is useful to both the network and other mobile device users. Various applications can utilize this presence information, such as instant messaging applications, push to talk over cellular (PoC) applications, or other applications that are known to those skilled in the art.

Instant messaging (IM) is a service that alerts users when another individual, such as a friend or colleague, is on-line and allows users to send messages to each other in real time, without the store and forward delays inherent in an electronic mail solution. With instant messaging, each user creates a list of other users with whom he or she wishes to communicate (commonly referred to as "buddy lists"). An instant messaging server keeps track of the on-line status of each of its subscribed users (often referred to as presence information), and when someone from a user's buddy list is on-line, the service alerts that user and enables immediate contact with the other user. On-line status, or activity states, include examples such as "Available", "Unavailable", "Connected" and "Do not disturb".

IM solutions are multiplying quickly and are showing up not only in wired environments used by PCs for example, but also in wireless environments used by mobile devices such as cell phones, smart phones, personal digital assistants (PDA's), pagers, phone enabled laptop computers and other mobile electronic devices. Wireless environments offer the potential for strong IM solutions because of the amount of time a user carries their mobile device with them.

Conventional instant messaging protocols encounter problems when deployed across wireless networks. It becomes difficult to maintain presence information for people who use instant messaging applications on their mobile device. The root cause of this problem is the inherently intermittent nature of the connection between a mobile device and a wireless network. While the conventional instant messaging protocols used to maintain accurate presence information do ultimately work for users of mobile devices, the accuracy of the mobile device user's presence as provided to other instant messaging users can suffer. Further, the necessity for a mobile device to send dedicated messages indicating presence information over the wireless network causes a greater amount of wireless network traffic, which causes a reduction in the battery life of the mobile device.

BRIEF DESCRIPTION OF THE DRAWINGS

The present application will be better understood with reference to the drawings in which.

DETAILED DESCRIPTION

The present apparatus and method overcome the limitations of the prior art by providing an intermediate server on a network that derives mobile device presence information by analyzing or monitoring the traffic going to and from the mobile device. Such a presence server is notified by a network node whenever a message is received from or sent to a mobile device, as well as whenever a message is blocked at the network node because the mobile device is unavailable.

In this manner, the presence server maintains accurate presence information for a given mobile device without introducing substantial new traffic to the wireless network. The presence server is also capable of differentiating different types of message traffic originated at the mobile device. The differentiating allows the presence server to distinguish between messages generated as a result of a user's interactive use of the mobile device, such as sending an email or requesting a web page, and background activity at the mobile device, such as automatic registration or acknowledgement message. By differentiating between interactive messages and background messages the presence server can properly determine if the mobile device is merely connected to the wireless network or if a user is actively using the mobile device.

In a further embodiment, a mobile device appends its activity status to some or all outgoing messages. In one embodiment, the mobile device appends an interactive bit to each message sent. The interactive bit would be set if the user is using the mobile device at the moment or had used the mobile device within a predetermined period. Another embodiment includes an inactivity time or values indicating to the presence server how long the user has been inactive on the mobile device. In an even further embodiment, information about one of multiple activity states could be appended to outgoing messages by the mobile device.

The present application therefore provides a method for deriving presence information of a mobile device at a presence node in a wireless system, the method comprising the steps of: analyzing a message sent from the mobile device to determine a message type; and allocating a state for the mobile device depending on the message type found in the analyzing step.

The present application further provides a presence node for deriving and maintaining presence information of a mobile device in a wireless system, the mobile device communicating with a network node, the presence node comprising: a communication system for communicating with the network node; a processor; and an application running on said processor, said application having means for analyzing a message sent from the mobile device at the network node to determine a message type; and allocating a state for the mobile device depending on the message type found in the analyzing step.

The present application still further provides a mobile device for enhancing presence information to a network, the mobile device comprising: a communications subsystem, said communications subsystem comprising a receiver, a transmitter and a digital signal processor; a microprocessor communicating with said digital signal processor of said communications subsystem; user input and output means communicating with said microprocessor; memory communicating with said microprocessor; and a status module, said status module adapted to append status information of the mobile device to messages being sent from said mobile device.

The present method and apparatus is directed to the derivation of presence information for a mobile device within a network. The method and apparatus are outlined in detail below. Presence information, as will be appreciated by those skilled in the art, can be used by the network for a variety of applications, including instant messaging and PoC applications, among others.

Figure 1:
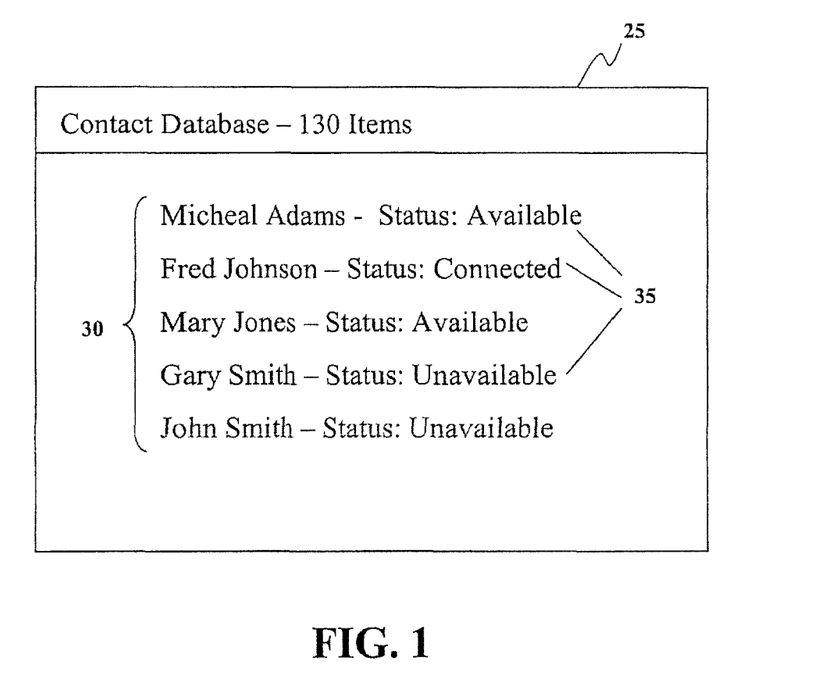
FIG. 1 is a view of a portion of a display of a mobile device showing an exemplary "buddy list" that is part of an instant messaging application.

Reference is now made to FIG. 1. FIG. 1 is a view of a portion of a display of a mobile device showing an exemplary contact database screen 25 which is part of the instant messaging application and displays a listing 30 of contacts stored in the contact database. FIG. 1 is included to provide an example of where presence information may be used, and it will be appreciated that the collation and distribution of presence information from the network to individual mobile devices is outside of the scope of the present method and apparatus.

As seen in FIG. 1, contact database screen 25 also provides on-line status information 35 for each contact listed in listing 30 and relates to the current status of the contact with regards to availability for a conversation.

On-line status information can be "Unavailable", "Available or "Connected" for example.

As will be appreciated by those skilled in the art, other states are possible depending on the implementation of the states by the instant messaging service. For example, if the mobile device provides information to a presence server, a richer availability status could be incorporated into the present apparatus and method. This could include, for example, information from the calendar of the mobile device indicating that the user may be in a meeting.

Figure 2:
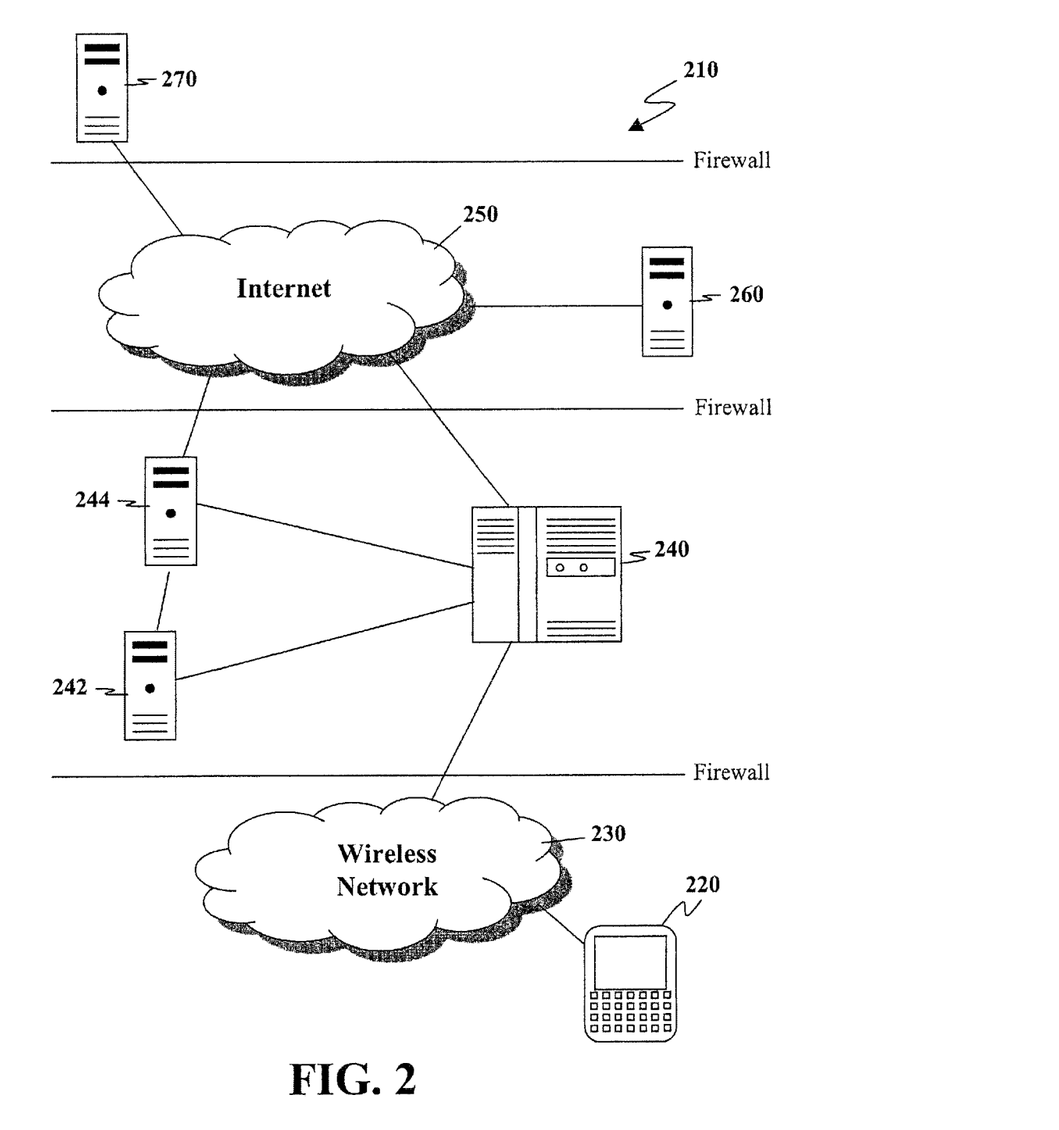
FIG. 2 is a block diagram of a system containing a mobile device and a presence server communicating with a network node.

Reference is now made to FIG. 2. FIG. 2 is a block diagram of an exemplary system 210 for use with instant messaging (or peer-to-peer messaging) according to the present apparatus and method. System 210 includes a mobile device 220, which may be any type of wireless mobile electronic communications device, such as a cell phone, a smart phone, a personal data assistant (PDA), a pager, a hand-held computer or a phone-enabled laptop computer, among others. As will be appreciated by those skilled in the art, system 210 will include multiple mobile devices 220 and the illustration of one mobile device 220 in FIG. 2 is merely meant as a simplification. Further, the above list of possible mobile devices is not meant to be limiting. Mobile device 220 can be any type of mobile device that can communicate through a wireless network.

Each mobile device 220 may be provided with various applications, including, without limitation, one or more currently existing applications that enable communications with other mobile devices 220, such as a wireless telephone application, an e-mail application, a short message service (SMS) application, a multi-media messaging service (MMS) application, an enhanced messaging service (EMS) application, and other internet enabled messaging applications. In addition, each mobile device 220 is provided with an application that implements peer-to-peer messaging such as instant messaging. The term "application" as used herein shall include one or more programs, routines, sub-routines, function calls or other type of software or firmware and the like, alone or in combination.

System 210 also includes a wireless network 230 with which mobile device 220 communicates. Wireless network 230 may be any wireless communication network or combination of interconnected networks, including, without limitation, Mobitex™, DataTAC™, TDMA, CDMA/1xRTT/EVDO, GSM/GPRS/EDGE/UMTS, PCS, EMTS or CDPD. As is known, wireless network 230 includes a plurality of base stations that perform radio frequency (RF) protocols to support data and voice exchanges with mobile device 220.

A network node 240 communicates with wireless network 230 and controls communication to and from mobile device 220.

An internal communications server 242 and a presence server 244 communicate with network node 240. Internal communications server 242 is adapted to allow communication between devices, either fixed or mobile.

Presence server 244 stores and maintains presence information for all mobile devices 220 that are under the control of network node 240, as described below in more detail. Presence server 244 includes a communications system for communicating with network node 240. Further, a processor on presence server 244 is adapted to run an application to maintain a state for all mobile devices 220 connected to network node 240.

Both presence server 244 and network node 240 communicate through a network such as Internet 250 with public communications servers 260 and/or enterprise communication servers 270. Public communications servers 260, enterprise communication servers 270, and/or internal communication servers 242 allow, among other things, communication, such as email or instant messaging, between fixed devices such as desktop computers and mobile device 220.

As will be appreciated, multiple wireless networks could communicate with network node 240, thereby allowing a mobile device 220 on a first wireless network to communicate with a second mobile device 220 on a second wireless network. Further, mobile device 220 can also communicate with fixed devices through enterprise communication server 270, public communication server 260 and internal communications server 242, as described above.

In one embodiment, presence server 244 is adapted to analyze traffic going to and coming from mobile device 220 through network node 240 to maintain accurate presence information for a given mobile device 220 without introducing any new traffic over wireless network 230. Presence information is maintained by presence server 244 without adding traffic to wireless network 230 and without reducing the battery life of mobile device 220 as will be described below.

In another embodiment, presence server 244 is adapted to receive notifications from network node 240 regarding messages to and from mobile device 220. The notifications sent from network node 240 to presence server 244 enable presence server 244 to maintain accurate presence information regarding mobile device 220.

In yet another embodiment, presence server 244 is a module operable within network node 240. Alternatively, presence server 244 could be a part of an instant messaging server (not shown) or other presence consuming server (not shown), and not be a separate server per se. A presence node, as used herein, is therefore any node in a network that incorporates the functionality of presence server 244.

As will be appreciated by those skilled in the art, presence server 244 derives various states for mobile device 220 based on the analyzed or monitored message traffic from mobile device 220. If mobile device 220 is not connected to wireless network 230, for example if it has been turned off or if it moves out of range of wireless network 230, network node 240 is unable to send a message to mobile device 220. This information is conveyed to presence server 244, which then figures out that mobile device 220 is no longer connected to wireless network 230 and thus is not accessible.

By monitoring traffic from mobile device 220, presence server 244 recognizes when mobile device 220 is connected to wireless network 230. The fact that mobile device 220 is connected to wireless network 230 however does not necessarily indicate that the user of mobile device 220 is in a position to receive an instant message or communicate through a peer-to-peer messaging application. Mobile device 220 could have been left on but put away by the user, for example, into a backpack or purse or left at the user's desk while the user is attending a meeting or other like scenarios. It is possible that the instant message will not be viewed by the user of mobile device 220 until later. It is therefore preferable to have a more detailed on-line status or activity state at presence server 244 and network node 240 for mobile device 220.

Presence server 244 recognizes when mobile device 220 is active, which as used herein means that the mobile device 220 is being actively used by a user. Presence server 244 monitors messages coming from mobile device 220. Certain messages can indicate to presence server 244 that mobile device 220 is actively being used by a user. Various types of messages exist, as will be appreciated by those skilled in the art, and only certain ones of those will be recognized as indicating that mobile device 220 is actively being used by a user, such as the sending of an email or a request for a Web page, for example. Other types of messages exist which do not necessarily indicate that mobile device 220 is actively being used by a user. For example, if network node 240 sends a ping or other type of probe to mobile device 220 to ensure that mobile device 220 is still connected, mobile device 220 is programmed to automatically send an acknowledgement back based on the probe to network node 240. However, the acknowledgement does not indicate that mobile device 220 is actively being used by a user, but merely that it is still connected. A user does not need to intervene to send the acknowledgement back to network node 240 and as such these types of messages are considered as background messages and indicate to presence server 244 that mobile device 220 is connected but not active.

Presence server 244 may improperly indicate the status of mobile device 220 as connected, instead of active, when mobile device 220 is actually being used by a user but messages are not being sent to network node 240. Examples of such circumstances include when the user is in the process of typing an email or reading an already downloaded webpage.

Presence server 244 may improperly indicate that the mobile device 220 is active when in fact it is merely connected. For example, if mobile device 220 has a "airplane mode" where messages are generated but are not sent because the radio must necessarily be turned off, or in other cases where that processing of e-mails is done and e-mails are sent at a later time, the presence server 244 may consider the batch sending of the e-mails to be indicative that mobile device 220 is actively being used by a user. However, the user may have, by this time, put mobile device 220 away and not in fact be active but merely be connected.

In an alternative embodiment of the present application, mobile device 220 could append information about its activity state to some or all outgoing messages.

In a first embodiment, a single bit can be added to each message sent between mobile device 220 and network node 240. The single bit can indicate a 1 to indicate that mobile device 220 is active or has been used within a certain amount of time prior to the message being sent. If mobile device 220 is actively used by a user, a timer can be set and before the expiry of the timer, the appended bit on outgoing messages could indicate that mobile device 220 is active. Once the timer expires, then the added bit could be a 0 to indicate that mobile device 220 is merely connected. This bit is appended to existing traffic, and thus the change for network resources and battery usage is minimal. Alternatively, a 0 could indicate that mobile device 220 is active and a 1 could indicate the mobile device is connected, as will be appreciated by those in the art.

In a further alternative embodiment, the information added to messages sent by mobile device 220 holds more information for presence server 244. A plurality of bits, or bytes could be added to messages sent from mobile device 220 to network node 240. The extra bits or bytes indicate the amount of time that has elapsed since the timer was last set. This could therefore give the presence server 244 a better indication of when mobile device 220 will move from an active to a connected state unless further actions are performed on mobile device 220.

In yet further alternative embodiments, a richer set of active states could be communicated by the mobile device 220. Such activity states are, for example, described in PCT Application publication number WO2005027429, entitled "A Method For Creating A Peer-To-Peer Immediate Messaging Solution Without Using An Instant Messaging Server", the contents of which are incorporated herein by reference. As will be appreciated by those skilled in the art, the various levels of availability could be appended to existing outgoing messages by mobile device 220.

The piggybacking of on-line status or activity state information on outgoing messages by mobile device 220 provides presence server 244 with a clear indication of when a user of mobile device 220 is actively using mobile device 220.

Figure 3:
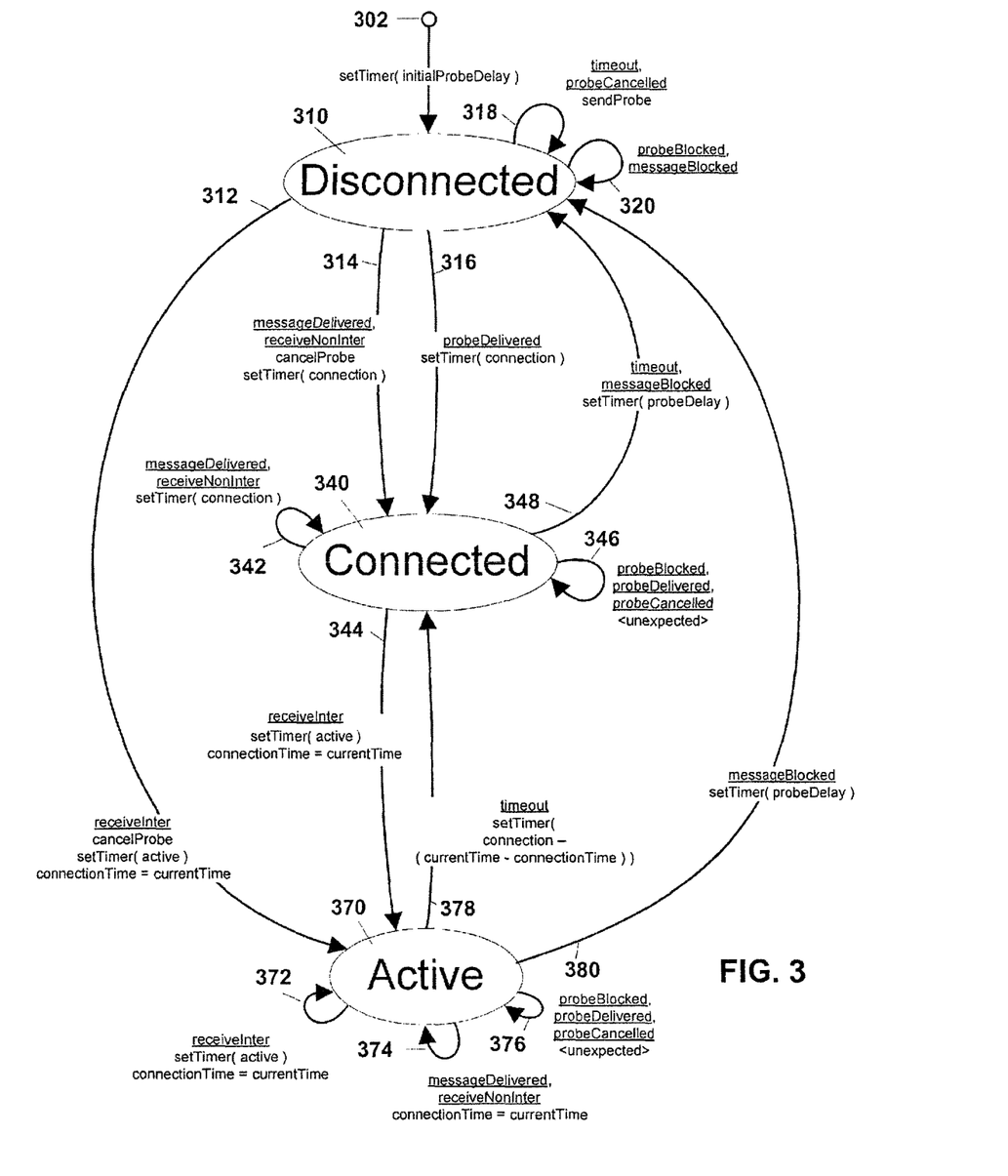
FIG. 3 is a state diagram showing the state of a mobile device as derived at a presence server.

Reference is now made to FIG. 3. FIG. 3 illustrates a state diagram for the state of a mobile device 220 as stored at presence server 244 from FIG. 2. Reference to mobile device 220, network node 240 and presence server 244 below refers to FIG. 2. One skilled in the art will realize that a separate state machine will exist at presence server 244 for each mobile device 220 that network node 240 controls.

The example of FIG. 3 shows that presence server 244 maintain state information for mobile device 220 which can be in one of three states, namely, disconnected state 310, connected state 340 and active state 370. As indicated above, other states are possible and the example of FIG. 3 is not meant to limit the scope of the present application but merely to show an example of how presence server 244 can maintain the state of a mobile device 220.

In the example of FIG. 3, a single timer exists to measure timeouts for movement between states. However, as will be explained in more detail below, more than one timer could be used in certain situations.

Starting point 302 occurs when presence server 244 first learns of a mobile device 220, as a result of an activation for example. At starting point 302, presence server 244 sets a timer to an initial probe delay value, as illustrated in the command setTimer (initial ProbeDelay). The expiry of the initial probe delay is when a first probe to mobile device 220 will be sent from the network node 240. Thus, if the initial probe delay value is set to 0, a probe is sent right away. If, however, it is set to an infinitely high number, the probe is never sent. This therefore shows that the probe concept is an optional concept.

Once the timer has been set in step 302, presence server 244 proceeds to note that mobile device 220 is in disconnected state 310. As can be seen from the state machine of FIG. 3, there are five possible paths labeled as 312, 314, 316, 318 and 320 respectively which can be effectuated from disconnected state 310.

Path 314 is followed where an indication of a successful message delivery to mobile device 220 is received at network node 240 from mobile device 220 or where a non-interactive indication is received from mobile device 220 at network node 240.

As used herein, a non-interactive indication is a message sent from mobile device 220 that only provides information to presence server 244 that the mobile device 220 is connected. No other information can be inferred from it. This includes regular traffic that is analyzed by presence server 244 which heuristically shows the message is non-interactive, such as an automatic acknowledgement, for example. It further includes a message sent from mobile device 220 that has been modified by the mobile device 220 to indicate that mobile device 220 is connected. This occurs in the embodiment described above in which a single bit has been added to outgoing messages from mobile device 220, where the single bit provides an indication that mobile device 220 is connected rather than the bit indicating the mobile device 220 is active. The other embodiments described above in which more bits or bytes are added to outgoing messages from mobile device 220 could equally be used to provide the non-interactive indication.

Similarly, an interactive indication is a message sent from mobile device 220 that provides information to presence server 244 that the mobile device 220 is active. This includes regular traffic that is analyzed by presence server 244 which shows that the user of mobile device 220 has sent an email or requested a Web page, for example. It further includes a message sent from mobile device 220 that has been modified by the mobile device 220 to indicate that mobile device 220 is active. This occurs in the embodiment described above in which a single bit has been added to outgoing messages from mobile device 220, where the single bit provides an indication that mobile device 220 is active. The other embodiments described above in which more bits or bytes are added to outgoing messages from mobile device 220 could equally be used to provide the interactive indication.

If path 314 is followed, the network node cancels any probe that it was about to send or that has been sent, and the timer in this case is set by presence server 244 to a maximum connection time constant. As will be appreciated, the connection time constant is the time that the network node will consider mobile device 220 to be connected without receiving any further confirmation of connection. Upon the expiration of a timer based on the connection value, if the mobile device 220 has not communicated with the network node then presence server 244 will note the state of mobile device 220 to be disconnected state 310 as explained in more detail below.

Path 316 is followed when a probe is delivered. The delivery of the probe and an acknowledgement from mobile device 220 indicates to presence server 244 that mobile device 220 is connected and therefore presence server 244 changes the state of mobile device 220 to a connected state 340. Further, presence server 244 sets the timer to a connection timer value.

Path 318 is followed if the timer with the initial probe delay value set in step 302 times out or if the probe is cancelled. In path 318, a probe is sent to see if the mobile device 220 has connected to wireless network 230 and the presence server 244 keeps its status of mobile device 220 in disconnected state 310.

Path 320 is followed if either a probe or a message is blocked at the network node 240. As will be appreciated by those skilled in the art, network node 240 has a storage means and receives data from public communications servers 260 and/or enterprise communication servers 270 to be forwarded to mobile device 220. Network node 240, can block this message if it realizes that mobile device 220 is not connected to wireless network 230.

Following path 320 results in the presence server 244 keeping the status of mobile device 220 as disconnected state 310.

Path 312 is followed if the network node 240 receives an interactive indication from mobile device 220, as indicated above. The presence server 244 changes the state of mobile device 220 to active state 370.

The received interactive message results in several actions being taken at presence server 244. The first action taken by presence server 244 is to cancel the probe if a probe exists. The next action taken by presence server 244 is to set a timer value to an active value, which is a constant. A third action taken by presence server 244 is to set the connection time to the current time. This is done to ensure that the connection timer value is maintained correctly as is explained in more detail below.

As can be seen from the state machine of FIG. 3, there are four possible paths labeled as 342, 344, 346, and 348 respectively which can be effectuated from connected state 340.

Path 342 is followed when a message is delivered to or a non-interactive indication is received from mobile device 220, as noted at presence server 244. In this case, presence server 244 keeps the state of mobile device 220 in connected state 340. Further, presence server 244 reset the timer to the connection value.

Path 344 is followed if network node 240 receives an interactive indication from mobile device 220. As indicated above, this can be heuristic or based on the contents of the message. Once the interactive message is received, presence server 244 sets the timer to an active value and the connection time to the current time. Presence server 244 moves the status of mobile device 220 within its state machine from connected state 340 to active state 370.

Path 346 is followed if the probe is blocked, the probe is delivered or a probe is cancelled. These are unexpected events for state 340 and are merely being included to have a complete state machine. However, if these events occur then presence server 244 keeps the status of mobile device 220 in connected state 340.

Path 348 is followed if a timeout occurs or if a message is blocked by network node 240. As will be appreciated by those skilled in the art, if no traffic exists between mobile device 220 and network node 240 for a certain period of time, network node 240 will consider mobile device 220 to no longer be connected. If a message is blocked that is being sent to mobile device 220, network node 240 will realize that mobile device 220 is not reachable and presence server 244 will change the state of mobile device 220 to disconnected state 310. If either a timeout occurs or the message is blocked, presence server 244 sets the timer value to a probe delay value. This probe delay value can be anywhere between zero and infinity depending on whether or not probes need to be sent and how aggressive the wireless network 230 and mobile device 220 are in terms of maintaining a connection. As will be appreciated by those skilled in the art, setting the value to 0 will require a probe to be sent immediately, which is a very aggressive or chatty means to ensure the accuracy of the connection status.

If the probe delay value is set to 0, battery power usage will be increased on mobile device 220 and will result in possible degraded performance of mobile device 220. A higher probe delay value may therefore be desired.

The probe delay value can be a balance between the ability to detect the presence with a battery power usage consideration.

As can be seen from the state machine of FIG. 3, there are five possible paths labeled as 372, 374, 376, 378, and 380 respectively which can be effectuated from active state 370.

Path 372 is followed if an interactive message is received. Presence server 244 will reset the timer to the active time constant and will set the connection time to be equal to the current time. The presence server 244 will further leave the state of mobile device 220 as active state 370.

Path 374 is followed if a message is delivered to mobile device 220 or a non-interactive indication is received by presence server 244. Presence server 244 sets the connection time to the current time and leaves the state of mobile device 220 in active state 370.

Path 376 is followed if a probe is blocked, a probe is delivered or a probe is cancelled. It will be appreciated that these are unexpected events to occur in active state 370 and presence server 244 leaves the state of mobile device 220 in active state 370 in this case.

Path 378 is followed if there is a timeout at presence server 244 when the state of mobile device 220 is noted as active state 370. As will be appreciated by those skilled in the art, presence server 244 sets the timer value to an active constant when the presence server first changes the state of the mobile device 220 to active state 370 or when a further interactive message is received. The timeout therefore occurs when the active period has expired. In this case, the state of mobile device 220 is changed by presence server 244 to connected state 340. Further, a timer value is set by presence server 244 to a value derived by the equation:

connection–(current time–connection time)

In active state 370, whenever an interactive, non-interactive or message delivered event occurs, the connection time is set to the current time. The equation above ensures that the time in the active state is discounted from a connection timer value.

As an alternative, a connection timer could be maintained as a separate timer to an active state timer. This, however, may increase hardware requirements or software requirements since two timers will need to be maintained instead of one at presence server 244.

Path 380 is followed if a message is blocked. In this case, the mobile device 220 is unreachable. Presence server 244 sets the timer value to a probe delay value and the state of mobile device 220 is changed to disconnected state 310.

The above therefore provides for the maintenance of a status of a mobile device 220 at a presence server 240, either by heuristic results or through the piggybacking of status information onto existing message traffic. Presence server 244 derives the presence of the mobile device 220 and maintains this state for use by instant messaging applications. Various events cause presence server 244 to change the state of mobile device 220. In the example of FIG. 3, three states are described and various paths to move between these states are outlined.

As will be appreciated, various modifications to the network of FIG. 2 are possible, and in turn can cause modifications of the state machine of FIG. 3. For example, network node 240 does not necessarily need to be present in a system. This, in turn, makes blocked messages and probes optional.

As will be further appreciated, when more than one active state exists, the state diagram can be modified by adding the multiple active states and the paths from each state based on events occurring.

In the embodiment described above in which an inactivity time is added to messages sent from mobile device 220, the transition between the active and connected states within presence server 244 can be tailored to change from active state 370 to connected state 340 upon the expiry of the inactivity timer. Other events could preempt this transition.

As will be appreciated by those skilled in the art, presence server 244 is a trusted component within system 210. In other words, in many cases, the analysis of traffic going to and from network node 240 is undesirable. However, the above method and system take advantage of message traffic analysis to improve user experience. This is possible because the component doing the analysis can be trusted with the information.

Once presence server 244 has presence information for a mobile device 220, this information can be stored and may be relayed to other interested contacts. This can, for example, include other mobile devices interested in instant messaging mobile device 220. The presence information could be used to supplement contact lists, as illustrated in FIG. 1. Presence information could also be used for other purposes, such as indicating to push services that a mobile device 220 is disconnected and thus no information should be pushed to it. Other examples of the use of presence information from presence server 244 would be known to those in the art.

Figure 4:
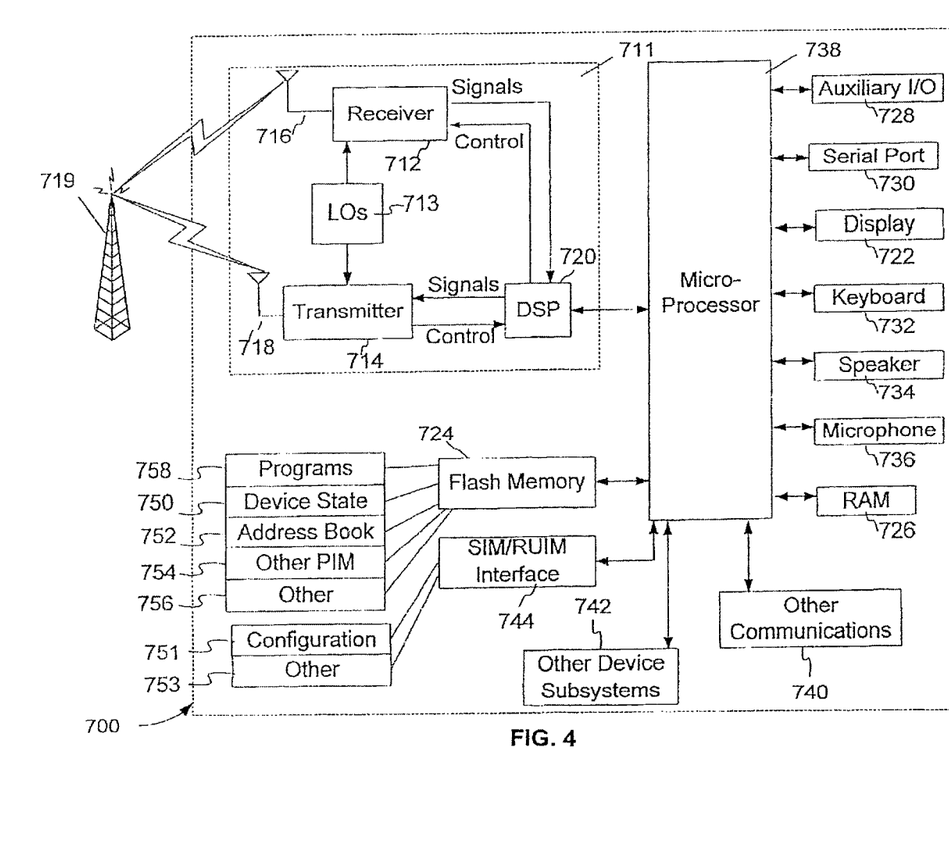
FIG. 4 is an exemplary mobile device that can be used in accordance with the present method and apparatus.

Reference is now made to FIG. 4. As indicated above, many types of mobile devices could be used with the above method and apparatus. FIG. 4 presents one exemplary mobile device that could be used with this system and method.

Mobile device 700 is preferably a two-way wireless communication device having at least voice and data communication capabilities. Mobile device 700 is equivalent to mobile device 220 from FIG. 2. Mobile device 700 preferably has the capability to communicate with other computer systems on a data network. Depending on the exact functionality provided, the wireless device may be referred to as a data messaging device, a two-way pager, a wireless e-mail device, a cellular telephone with data messaging capabilities, a wireless data network appliance, or a data communication device, as examples.

When mobile device 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile device 700 may include a communication subsystem 711 designed to operate within the Mobitex" mobile communication system, the DataTAC™ mobile communication system, GPRS network, UMTS network, EDGE network or CDMA network, among others.

Network access requirements will also vary depending upon the type of network 719. For example, in the Mobitex and DataTAC networks, mobile device 700 is registered on the network using a unique identification number associated with each mobile device. In UMTS and GPRS networks, and in some CDMA networks, however, network access is associated with a subscriber or user of mobile device 700. A GPRS mobile device therefore requires a subscriber identity module (SIM) card in order to operate on a GPRS network, and a removable user identity module (RUIM) in order to operate on some CDMA networks. Without a valid SIM/RUIM card, a GPRS/UMTS/CDMA mobile device may not be fully functional. Local or non-network communication functions, as well as legally required functions (if any) such as "911" emergency calling, may be available, but mobile device 700 will be unable to carry out any other functions involving communications over the network 700. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile device 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, other communication subsystem 740 such as a short-range communications subsystem and any other device subsystems generally designated as 742.

Some of the subsystems shown in FIG. 4 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on mobile device 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile device 700. Other applications could include a status module (for example as part of block 756) to append information to outgoing messages based on a status of the mobile device.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile device 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would preferably be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 4, would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method comprising:
   analyzing a message sent from a mobile device to determine, based on the message's type, whether the message was generated with user interaction or generated without user interaction;
   setting a first activity state if the message was generated with user interaction;
   setting a second activity state if the message was generated without user interaction;
   in response to determining that the message was generated with user interaction, resetting a timer; and
   sending a probe to the mobile device when the timer expires to check whether the mobile device is still in the first activity state;
   the analyzing step and the setting steps being performed by a hardware server;
   wherein the server is configured to analyze traffic going to and coming from the mobile device without introducing new traffic over the wireless network.

2. The method of claim 1 further comprising:
   the server informing a push service of the state so that the push service may determine, based on the assigned state, whether to push information to the mobile device.

3. The method of claim 1 wherein the analyzing includes determining that the message was generated with user interaction based on the message being an instant message.

4. The method of claim 1 wherein the analyzing includes determining that the message was generated with user interaction based on the message being an email.

5. The method of claim 1 wherein the message is from the mobile device to another communication device as part of unaltered traffic.

6. The method of claim 1 wherein the first activity state is an active state, and the second activity state is a connected state.

7. The method of claim 1 wherein the determining that the message was not generated with user interaction is based on the message being an acknowledgement that the mobile device automatically sent in response to a probe sent by a network node to check if the mobile device is still connected.

8. The method of claim 1 further comprising:
   the server setting a disconnected state based on the message not having sent a message for a predetermined amount of time.

9. A hardware server configured to:
   analyze a message sent from a mobile device to determine, based on the message's type, whether the message was generated with user interaction or generated without user interaction;
   set a first activity state if the message was generated with user interaction;
   set a second activity state if the message was generated without user interaction;
   in response to determining that the message was generated with user interaction, reset a timer; and
   send a probe to the mobile device when the timer expires to check whether the mobile device is still in the first activity state;
   wherein the server is configured to analyze traffic going to and coming from the mobile device without introducing new traffic over the wireless network.

10. The hardware server of claim 9 wherein the first activity state is an active state, and the second activity state is a connected state.

11. The hardware server of claim 9 further configured to:
    set a disconnected state based on the message not having sent a message for a predetermined amount of time.

* * * * *